United States Patent
Mellteg et al.

(10) Patent No.: US 9,933,840 B2
(45) Date of Patent: Apr. 3, 2018

(54) APPARATUS, POWER SYSTEM, COMPUTER PROGRAM, AND METHOD

(71) Applicant: Telefonaktiebolaget L M Ericsson (publ), Stockholm (SE)

(72) Inventors: Magnus Mellteg, Kalmar (SE); Torbjorn Holmberg, Kalmar (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 309 days.

(21) Appl. No.: 14/443,303

(22) PCT Filed: Apr. 10, 2015

(86) PCT No.: PCT/EP2015/057860
§ 371 (c)(1),
(2) Date: May 15, 2015

(87) PCT Pub. No.: WO2016/162089
PCT Pub. Date: Oct. 13, 2016

(65) Prior Publication Data
US 2017/0090547 A1    Mar. 30, 2017

(51) Int. Cl.
*G06F 1/00*   (2006.01)
*G06F 1/32*   (2006.01)
(Continued)

(52) U.S. Cl.
CPC ............ *G06F 1/3287* (2013.01); *G06F 1/266* (2013.01); *G06F 1/3253* (2013.01); *G06F 13/4282* (2013.01)

(58) Field of Classification Search
CPC ...... G06F 1/3287; G06F 1/3253; G06F 1/266; G06F 13/4282
See application file for complete search history.

(56) References Cited

U.S. PATENT DOCUMENTS

2005/0272402 A1* 12/2005 Ferentz .................. H04L 12/10
                                                      713/320
2011/0307111 A1   12/2011 Pereira
(Continued)

FOREIGN PATENT DOCUMENTS

WO   2014198309 A1   12/2014

OTHER PUBLICATIONS

International Search Report and Written Opinion, Application No. PCT/EP2015/057860, dated Nov. 25, 2015, 14 pages.
(Continued)

*Primary Examiner* — Xuxing Chen
(74) *Attorney, Agent, or Firm* — NDWE LLP

(57) ABSTRACT

An apparatus for a power system with a power input at an upstream end and power outputs connected to loads in a downstream end, the power system comprising a plurality of devices interconnected in a tree topology. The apparatus communicatively coupled to each of the devices and configured to identify each of the devices, cause a change of an operation state or parameter of each of the devices at a time. The apparatus further configured to determine, for each of the devices having an operation state or parameter thereof changed, which of the other devices having a related change of an operation state or parameter thereof, and identify how the devices are connected in the tree topology based on said determined other devices having a related change of an operation state or parameter thereof, for each of said devices having an operation state or parameter thereof changed.

18 Claims, 5 Drawing Sheets

(51) Int. Cl.
    *G06F 13/42*     (2006.01)
    *G06F 1/26*     (2006.01)

(56) References Cited

U.S. PATENT DOCUMENTS

2012/0155328 A1     6/2012   Saulsbury et al.
2013/0013949 A1*   1/2013   Mohammed ............ G06F 1/266
                                                     713/340

OTHER PUBLICATIONS

"I2C-bus specification and user manual", Revision 6, UM10204, NXP Semiconductors, <http://www.nxp.com/documents/user_manual/UM10204.pdf> (Apr. 4, 2014), 64 pages.
"System Management Bus (SMBus) Specification," Version 3.0, System Management Interface Forum, Inc., (Dec. 20, 2014), 85 pages.
"PMBus Power System Management Protocol Specification" Parts I-III, Revision 1.3.1, System Management Interface Forum, Inc., (Mar. 13, 2015), 182 pages.

* cited by examiner

APPARATUS, POWER SYSTEM, COMPUTER PROGRAM, AND METHOD

CROSS-REFERENCE TO RELATED APPLICATIONS

This application is a National stage of International Application No. PCT/EP2015/057860, filed Apr. 10, 2015, which is hereby incorporated by reference.

TECHNICAL FIELD

The technical field concerns generally power systems. Particularly, the technical field concerns apparatuses, computer programs, and methods configured to identify how devices are connected in a power system as well as power systems comprising such apparatuses.

BACKGROUND

A power system comprises typically several digital filter and DC/DC conversion components. These can be configured and monitored through e.g. the open standard power-management protocol Power Management Bus (PMBus).

A typical intermediate bus architecture (IBA) may comprise one power input module (PIM), which supports one or several intermediate bus converters (IBCs), which in turn support several point of load units (PoLs) in a tree based configuration. The PoLs are in turn connected to one or more loads.

SUMMARY

For an apparatus, which configures and/or monitors several devices in a power system, it is desirable to know how the different devices of the power system are connected to one another from a power train point of view.

A first aspect refers therefore to an apparatus, e.g. a board power manager (BPM), for a power system with a power input at an upstream end and several power outputs connected to one or more loads in a downstream end, the power system comprising a plurality of devices interconnected in a tree topology, and wherein a change of an operation state or parameter of each of the devices causes a related change of an operation state or parameter of other ones of the devices connected to that device downstream thereof. The apparatus is communicatively connected to each of the devices and comprises a processor and a memory storing instructions that, when executed by the processor, causes the apparatus (i) to identify each of the devices interconnected in the tree topology; (ii) to cause a change of an operation state or parameter of each of the devices at a time; (iii) to determine, for each of the devices having an operation state or parameter thereof changed, which of the other devices having a related change of an operation state or parameter thereof, if any; and (iv) to identify how the devices are connected in the tree topology based on the determined other devices having a related change of an operation state or parameter thereof, if any, for each of said devices having an operation state or parameter thereof changed.

In one embodiment, the memory is storing instructions that, when executed by the processor, causes the apparatus (i) to identify the most downstream devices by identifying those ones of the devices, for which a change of an operation state or parameter thereof does not cause any other devices to have a related change of an operation state or parameter thereof; and (ii) to identify the second most downstream devices by identifying those ones of the devices, which are not identified as the most downstream devices, for which a change of an operation state or parameter thereof does not cause any other ones of the devices, which are not identified as the most downstream devices, to have a related change of an operation state or parameter thereof.

When the number of most and second most downstream devices is less than the number of identified devices interconnected in the tree topology, i.e. the tree topology comprises devices in more then two levels, the memory is storing instructions that, when executed by the processor, causes the apparatus to identify the third most downstream devices by identifying those ones of the devices, which are not identified as the most or second most downstream devices, for which a change of an operation state or parameter thereof does not cause any other ones of the devices, which are not identified as the most or second most downstream devices, to have a related change of an operation state or parameter thereof.

When the number of most, second most, and third most downstream devices is less than the number of identified devices interconnected in the tree topology, i.e. the tree topology comprises devices in more then three levels, the memory is storing instructions that, when executed by the processor, causes the apparatus to identify the fourth most downstream devices by identifying those ones of the devices, which are not identified as the most, second most, or third most downstream devices, for which a change of an operation state or parameter thereof does not cause any other ones of the devices, which are not identified as the most, second most, or third most downstream devices, to have a related change of an operation state or parameter thereof.

When the tree topology comprises more than four levels, the memory is storing instructions that, when executed by the processor, causes the apparatus to identify the devices on these levels in a corresponding manner.

Further, the memory may be storing instructions that, when executed by the processor, causes the apparatus (i) to determine how the most downstream devices are connected to the second most downstream devices based on which of the most downstream devices having an operation state or parameter thereof changed for each of the second most downstream devices having an operation state or parameter thereof changed; (ii) to determine how the second most downstream devices are connected to the third most downstream devices, if any, based on which of the second most downstream devices having an operation state or parameter thereof changed for each of the third most downstream devices having an operation state or parameter thereof changed; and (iv) to determine how the third most downstream devices are connected to the fourth most downstream devices, if any, based on which of the third most downstream devices having an operation state or parameter thereof changed for each of the fourth most downstream devices having an operation state or parameter thereof changed.

Obviously, for a two-level tree topology only the first sequence above, i.e. step (i), has to be performed, and for a three-level tree topology only the first two sequences above, i.e. steps (i) and (ii), have to be performed.

When the tree topology comprises more than four levels, the memory is storing instructions that, when executed by the processor, causes the apparatus to determine how the devices on these levels are connected in a corresponding manner.

The tree topology, typically being an intermediate bus architecture (IBA), may comprise one power input module (PIM), which may support one or several intermediate bus converters (IBCs), or DC/DC converters, which in turn may support several point of load units (PoLs). The apparatus for identifying how the devices are connected in the tree topology may be any kind of device in the power system, such as a BPM, a verification device, a configuration device, or a control device. It may be a stand-alone device or it may be integrated into any of the devices of the tree topology, i.e. into any of the PIMs, IBCs, or PoLs.

The apparatus may be a communicatively connected to the devices via a serial bus protocol, such as the open standard power-management protocol Power Management Bus (PMBus) protocol. Other examples of usable buses are SMBus, I²C, and SBI bus.

In the PMBus protocol, the identification of each of the devices interconnected in the tree topology may be realized by means of scanning the devices using e.g. READ_BLOCK commands to the MFR_MODEL register (0x9A).

In one embodiment, the change of an operation state or parameter of each of the devices may comprise to turn the device off and the related change of an operation state or parameter thereof may comprise the loss of power. I.e., when a device is switched off, all downstream devices connected to that device will lose power.

In the PMBus protocol, devices may be turned off using OPERATION (0x01) commands or by switching the CTRL pin.

In some applications, when e.g. devices are connected to a certain load such as e.g. one or more ASICs, it may be favorable to not turn off devices, thereby turning off the power to the load.

Therefore, in another embodiment, the change of an operation state or parameter of each of the devices may comprise to alter the duty cycle of the device. The related change of an operation state or parameter thereof may comprise a corresponding duty cycle alteration or output current alteration of connected downstream power converters.

In the PMBus protocol, duty cycle of devices may be altered using Margin Low or Margin High in OPERATION (0x01) commands. A corresponding duty cycle alteration may be read by READ_DUTY_CYCLE commands (0x94) and a corresponding output current alteration may be read by READ_IOUT commands (0x8C).

In yet another embodiment, the two embodiments may be combined. For instance, if there are devices, wherein the duty cycle cannot be altered, such device may be turned off or it may be known that such devices belong to the most upstream level of devices. Other devices may have their duty cycle altered as disclosed above. Typically, PIMs and unregulated IBCs may not have margining capabilities.

The above approaches may be utilized in a variety of manners.

In one embodiment, the memory of the apparatus may be storing an identification of each of the devices that should be connected in the tree topology. This may have been entered into the memory at installation. The memory may be storing instructions that, when executed by the processor, causes the apparatus to compare the identified devices interconnected in the tree topology with the devices that should be connected in the tree topology to verify the devices.

In a BPM, this embodiment may be implemented as a built-in self test (BIST).

Alternatively, or additionally, the memory of the apparatus may be storing an identification of how the devices should be connected in the tree topology, and the memory may be storing instructions that, when executed by the processor, causes the apparatus to compare how the devices are connected in the tree topology with how the devices should be connected in the tree topology to verify the tree topology. How the devices should be connected in the tree topology may also have been entered into the memory at installation.

In another embodiment, the memory may be storing instructions that, when executed by the processor, causes the apparatus to perform an operation, such as e.g. determining how the power system should be operated, based on how the devices are connected in the tree topology. This may be performed at installation or configuration and how the devices are connected in the tree topology may be entered into the memory to constitute the above identification of each of the devices that should be connected in the tree topology and/or identification of how the devices should be connected in the tree topology.

A device that is served with a power supply from a device in a previous step may be defined as a downstream power converter (DSPC) device and a device that supplies another device or several other devices with power may be defined as a upstream power converter (USPC) device.

A second aspect refers to a power system comprising the apparatus of the first aspect.

A third aspect refers to a computer program for an apparatus for a power system with a power input at an upstream end and several power outputs connected to one or more loads in a downstream end, the power system comprising a plurality of devices interconnected in a tree topology, and wherein a change of an operation state or parameter of each of the devices causes a related change of an operation state or parameter of other ones of the devices connected to that device downstream thereof. The computer program comprises computer program code which, when run on the apparatus causes the apparatus: to identify each of the devices interconnected in the tree topology; to cause a change of an operation state or parameter of each of the devices at a time; to determine, for each of the devices having an operation state or parameter thereof changed, which of the other devices having a related change of an operation state or parameter thereof, if any; and to identify how the devices are connected in the tree topology based on said determined other devices having a related change of an operation state or parameter thereof, if any, for each of said devices having an operation state or parameter thereof changed.

The computer program may constitute part of monitoring software for monitoring the power system, configuring software for configuring the power system, or controlling software for controlling the power system.

The apparatus may be an apparatus described above with reference to the first aspect.

A fourth aspect refers to a method for a power system with a power input at an upstream end and several power outputs connected to one or more loads in a downstream end, the power system comprising a plurality of devices interconnected in a tree topology, and wherein a change of an operation state or parameter of each of the devices causes a related change of an operation state or parameter of other ones of the devices connected to that device downstream thereof. The method comprises the steps of: identifying each of the devices interconnected in the tree topology; causing a change of an operation state or parameter of each of the devices at a time; determining, for each of the devices having an operation state or parameter thereof changed, which of the other devices have a related change of an operation state or parameter thereof, if any; and identifying how the devices are connected in the tree topology based on said determined other devices having a related change of an operation state or parameter thereof, if any, for each of said devices having an operation state or parameter thereof changed.

It shall be appreciated that the second and third aspects may be modified to encompass any of the embodiments or variants disclosed above with reference to the first aspect.

The above aspects and approaches are straightforward to perform, and are fast efficient, precise, and easy to implement.

In many protocols, such as e.g. in the PMBus protocol, they are capable of being performed using existing standard commands.

Further characteristics and advantages will be evident from the detailed description of embodiments given hereinafter, and the accompanying FIGS. 1-5, which are given by way of illustration only.

DETAILED DESCRIPTION

Figure 1:
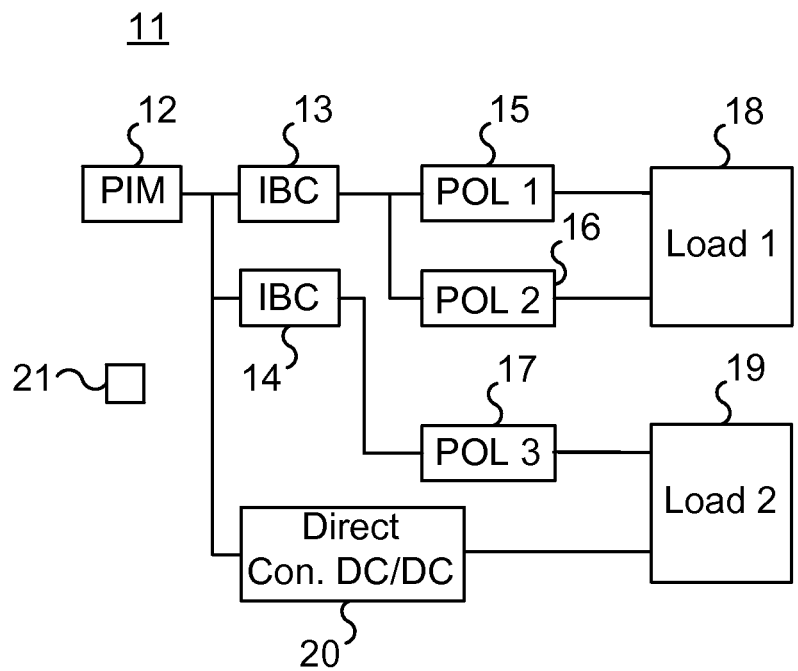
FIG. 1 illustrates, schematically, in a block diagram a power system comprising an apparatus for automatic power system identification.

FIG. 1 illustrates, schematically, in a block diagram an example of a power system 11 comprising an apparatus 21 for automatic power system identification.

The power system 11 comprises a power input at an upstream end, several power outputs connected to one or more loads 18, 19 in a downstream end, and a plurality of devices 13-17, 20 interconnected in a tree topology, wherein a change of an operation state or parameter of each of the devices 13-17, 20 causes a related change of an operation state or parameter of other ones of the devices connected to that device downstream thereof. In one version, the change of an operation state or parameter of each of the devices 13-17, 20 comprises to turn the device off and the related change of an operation state or parameter thereof comprises the loss of power. This is a common property of power systems. Each device 13-17, 20 in the tree topology is powered by the device connected to it in an upstream end thereof. That is, devices 13, 14, and 20 are powered by device 12, device 15 and 16 are powered by device 13, and device 17 is powered by device 14.

The devices comprises a power input module (PIM) 12, two intermediate bus converters (IBCs) 13, 14, three point of load (PoL) devices 15, 16, 17 and a direct DC/DC converter 20.

The apparatus 21 for automatic power system identification may be a board power manager (BPM). However, the apparatus 21 may alternatively be implemented in any of a verification device, configuration device, or control device of the power system. Yet alternatively, the apparatus 21 may be integrated into any of the devices of the 13-17, 20 interconnected in the tree topology.

The apparatus 21 may be communicatively connected to the devices via a serial bus protocol such as the open standard power-management protocol Power Management Bus (PMBus) protocol.

The PMBus protocol is owned by the organization System Management Interface Forum (SMIF). It is a protocol based on the SMBus specification, which in turned is based on the I²C serial bus protocol. In year 2015, the SMIF organization released PMBus spec v1.3 for part I, II and III and also SMBus Specification v3.0.

Figure 2:
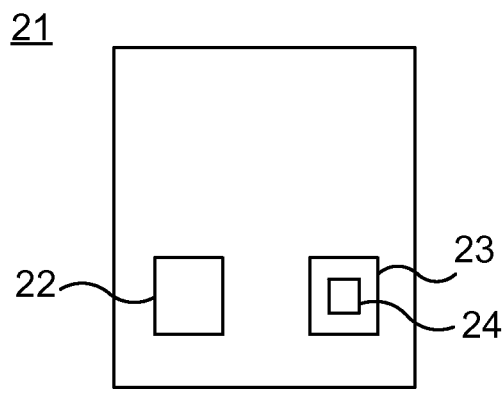
FIG. 2 illustrates, schematically, in a block diagram the apparatus for automatic power system identification of FIG. 1 in greater detail.

FIG. 2 illustrates, schematically, in a block diagram the apparatus 21 for automatic power system identification of FIG. 1 in greater detail. The apparatus 21 comprises a processor 22 and a memory 23 storing instructions 24 that, when executed by the processor, causes the apparatus to perform any of the methods disclosed herein at configuration of the power system and/or repeatedly e.g. for verification purposes.

The instructions are comprised in a computer program, which may in turn, be a portion of a verification software, configuration software and/or control software for the power system.

The computer program and a computer readable means, on which the computer program is stored, such as the memory 23, form a computer program product. The computer readable means may be any of a CD, DVD, external memory, hard drive, memory stick, or server.

Figure 3:
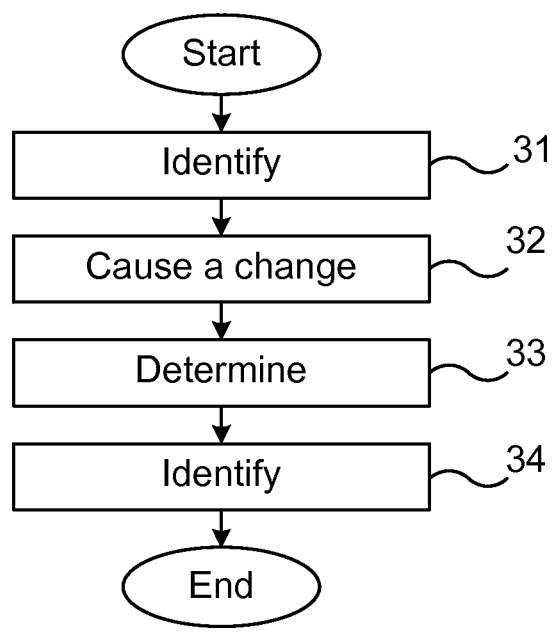
FIG. 3 is a schematic flow scheme of an embodiment of a method for automatic identification of a power system such as the power system of FIG. 1.

FIG. 3 is a schematic flow scheme of an embodiment of a method for automatic identification of a power system such as the power system of FIG. 1. The method may be performed by the apparatus 21.

In a step 31, each of the devices interconnected in the tree topology is identified, and, in a step 32, each of the devices is turned off at a time.

In the PMBus protocol, the bus is scanned for devices and the devices are turned off by enable/disable commands.

The devices may be scanned by sending a READ_BLOCK command to the MFR_MODEL register (0x9A) request to all possible PMBus address positions (0x00-0x7F). If the MFR_MODEL for an address is not empty, the address is defined to be used and therefore it is added to the list of devices connected to the PMBus.

Two types of enable/disable typically exists: either by performing the PMBus write command OPERATION (0x01) or by switching the CTRL pin.

An isolated DC/DC converter has typically an additional, or alternative, Remote Control (RC) pin for enable/disable control on the primary side.

A PIM has primary side remote control pins, one for each main supply (A and B typically).

In a step 33, it is determined for each of the devices being turned off, which of the other devices lose its power, if any.

Finally, in a step 34, it is identified how the devices are connected in the tree topology based on the determined other devices losing power, if any, for each of the devices being turned off. A detailed example of how this can be performed is found below.

Figure 4:
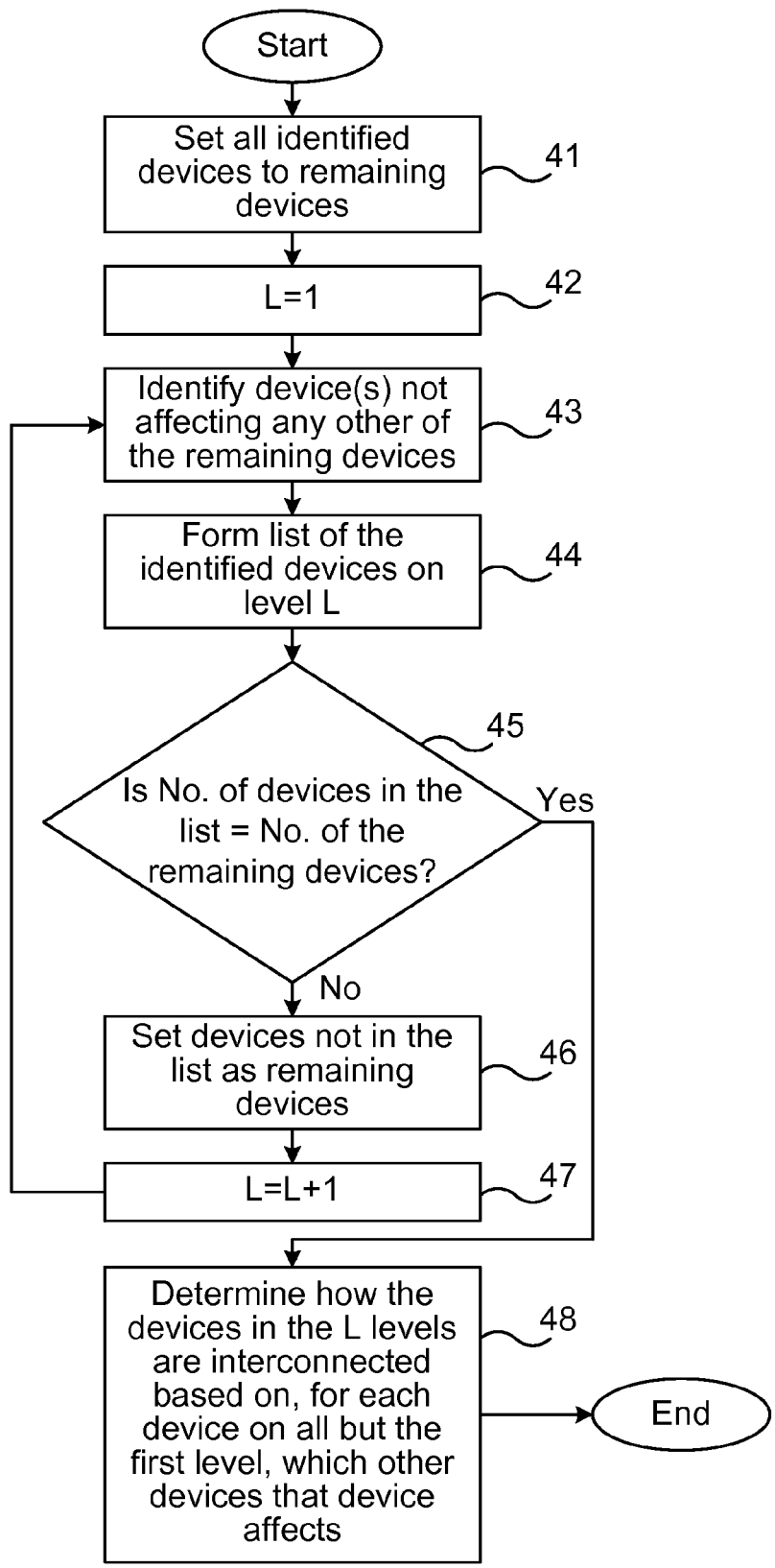
FIG. 4 is a schematic flow scheme of an embodiment of part of the method of FIG. 3.

FIG. 4 is a schematic flow scheme of an embodiment of part of the method of FIG. 3. After steps 31-33 of FIG. 3, all identified devices are set, in a step 41, to remaining devices, and a variable L is, in a step 42, set to 1. Next, devices, which when being turned off, do not cause any other of the remaining devices to lose its power, are, in a step 43, identified. A list of the devices identified on level L is, in a step 43, formed. It is then checked, in a step 45, whether the number of devices in the list is equal to the number of remaining devices.

If the answer is affirmative, it is, in a step 48, determined how the devices in the L levels are interconnected based on, for each device on all but the first level, which devices on the immediately lower level lose power when the device is turned off.

If the answer is negative, i.e. the number of devices in the list is not equal to the number of remaining devices, the devices not in the list formed in step 44, are, in a step 46, set as the remaining devices, the variable L is, in a step 47, incremented by one, and the method is returned to step 43. The steps 46, 47, 43, 44, and 45 form a loop, which is repeated until the number of devices in the list is equal to the number of remaining devices, that is, no further levels exist.

The method is then ended by determining how the devices are interconnected in step 48. The value of the variable L indicates how many levels of devices there are in the tree topology. L=1 corresponds to the most downstream devices, also referred to as end-point devices, L=2 corresponds to second most downstream devices, L=3 corresponds to third most downstream devices, etc.

For instance, for the power system 11 of FIG. 1, there are three levels. Devices 15, 16, 17, and 20 will form the list for L=1, devices 13, 14 will form the list for L=2, and device 12 will form the list for L=3. The loop (i.e. steps 46, 47, 43, 44, and 45) will be followed twice. Finally, in step 48, the tree topology can be identified by noting that devices 15 and 16 lose power when device 13 is turned off, that device 17 loses power when device 14 is turned off, and that devices 13 and 14 lose power when device 12 is turned off.

In one embodiment, the memory of the apparatus may be storing an identification of each of the devices that should be connected in the tree topology, wherein the identified devices interconnected in the tree topology are compared with the devices that should be connected in the tree topology to verify the devices. Such verification may be performed repeatedly.

Additionally, or alternatively, the memory of the apparatus may be storing an identification of how the devices should be connected in the tree topology, wherein it is compared how the devices are connected in the tree topology with how the devices should be connected in the tree topology to verify the tree topology. Such verification may be performed repeatedly.

In another embodiment, an operation is performed, such as e.g. determining how the power system should be operated, based on how the devices are connected in the tree topology as determined by a method disclosed herein.

FIGS. 5a-i are lists and structures of addresses of devices as determined on a PMBus during an example embodiment of the method of FIGS. 3-4.

Figure 5A:
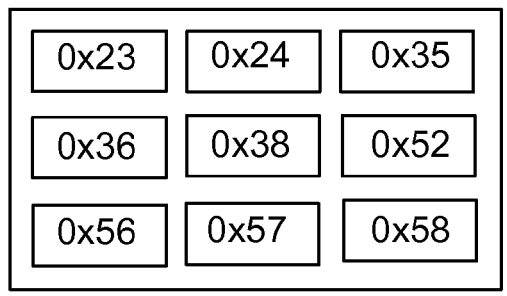
FIGS. 5*a-i* are lists and structures of addresses of devices as determined during an example embodiment of the method of FIGS. 3-4.

Scanning of the PMBus gives a list of devices with the addresses shown in FIG. 5a.

Figure 5B:
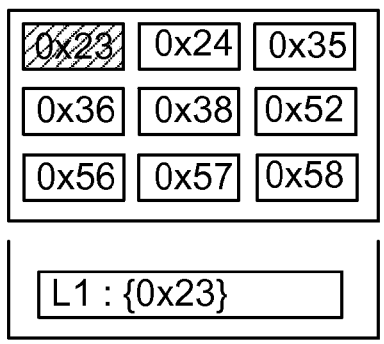

One device is turned off at a time, and it is checked which of the other devices, if any, that can no longer be found. When 0x23 is turned off all other devices can still be found. 0x23 is added to a first list L1 of level 1 devices, i.e. most downstream or end-point devices. The result is shown in FIG. 5b.

Figure 5C:
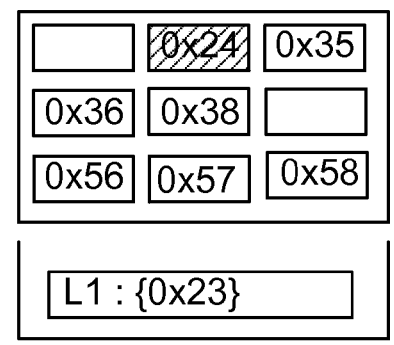

When 0x24 is turned off, some devices disappear. The result is shown in FIG. 5c.

Figure 5D:
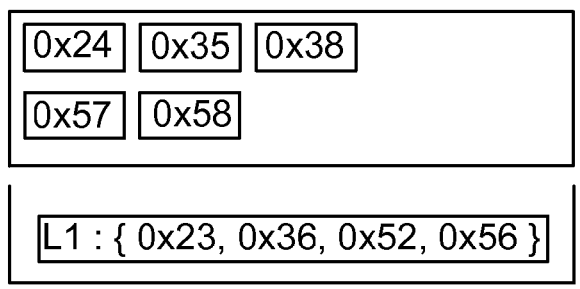

The method is continued with all devices, and at this stage the first list L1 of devices not connected to any other devices of the tree topology downstream thereof is complete. The first list L1 and remaining devices are shown in FIG. 5d.

Figure 5E:
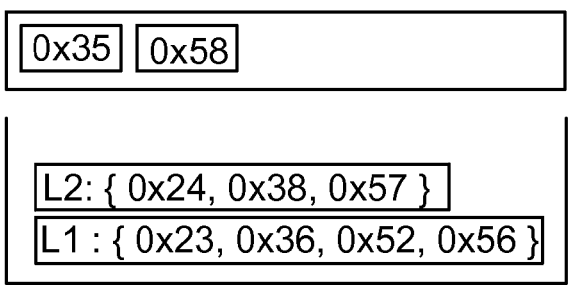

The above procedure is repeated for the remaining devices 0x24, 0x35, 0x38, 0x57, and 0x58 to form a second list L2 of level 2 devices, i.e. second most downstream devices. The first and second lists L1 and L2 and still remaining devices 0x35 and 0x58 are shown in FIG. 5e.

Figure 5F:
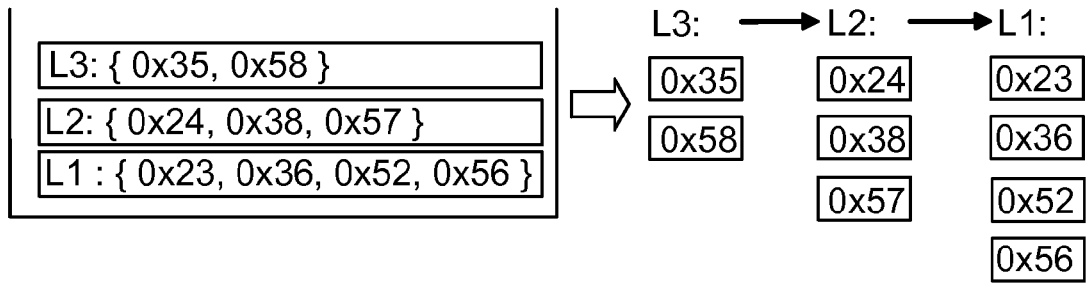

The above procedure is repeated once more to check whether turning off each of the still remaining devices 0x35 and 0x58 would cause the other to disappear. This is not the case, and a third list L3 of level 3 devices, i.e. third most downstream devices, is formed. FIG. 5f shows the three lists (to the left) and a tree topology without connections (to the right).

Figure 5G:
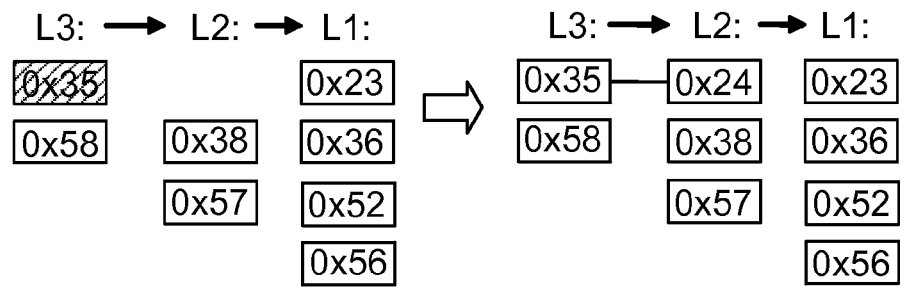

Next, it is checked which devices in the second list L2 that disappear when a first device 0x35 in the third list L3 is turned off. It can be seen that device 0x24 disappears and that 0x35 is thus connected to 0x24. The result is shown in FIG. 5g.

Figure 5H:
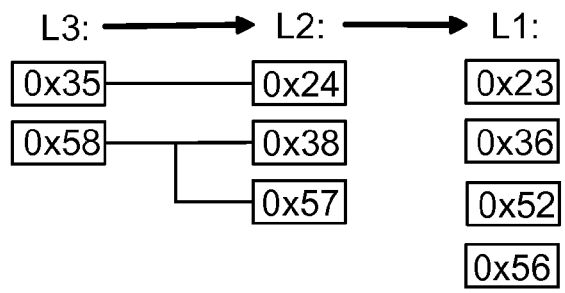

Next, it is checked which devices in the second list L2 that disappear when the second device 0x58 in the third list L3 is turned off. It can be seen that devices 0x38 and 0x57 disappear and that 0x58 is thus connected to 0x38 and 0x57. The connections between the third L3 and second L2 level are thus identified and the result is shown in FIG. 5h.

Figure 5I:
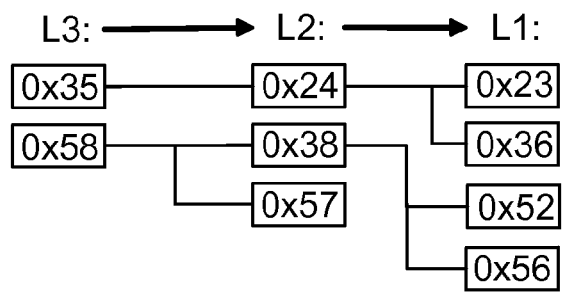

In a similar manner the connections between second L2 and first L1 level are identified and the final result is shown in FIG. 5i.

It shall be appreciated that in some cases it might be troublesome to turn off the power for investigating how the devices are connected.

If a PoL is connected to a load, such as e.g. an ASIC or an FPGA, it may not be appropriate to turn on and off the power. Further, if a device is not powered it is not possible to communicate with it.

In an alternative embodiment, the change of an operation state or parameter of each of the devices may comprise to alter the duty cycle of the device and the related change of an operation state or parameter thereof may comprise a corresponding duty cycle alteration or output current alteration.

The duty cycle or output current is read out from all devices, the duty cycle of each of the devices is altered, and it is checked, for each device having its duty cycle altered, which other devices have their duty cycle or output current altered.

In other respects, the embodiment is similar to the above embodiments related to turning off devices.

The PMBus OPERATION command (0x01) allows also for minor up- and down changes of the power system output voltages. This is feature is called "margining". By using bit 5:4 in the OPERATION command the power converter can be caused to enter the following modes:

| [5:4] | Mode |
| --- | --- |
| 00 | Normal |
| 01 | Margin Low |
| 02 | Margin High |

PIMs and un-regulated IBCs do typically not have margining capabilities.

By changing the output voltage of a device using OPERATION[5:4] as described above, the duty cycle of a downstream power converter will change:

| OPERATION Mode | Effect on power converter's duty cycle, D |
| --- | --- |
| Normal -> Margin Low | D will decrease with Δd |
| Normal -> Margin High | D will increase with Δd |
| Margin Low -> Margin High | D will increase with ~2Δd |
| Margin High -> Margin Low | D will decrease with ~2Δd |

The power converter's duty cycle is read by the READ_DUTY_CYCLE PMBus command (0x94).

Alternatively, by changing the output voltage of a downstream power converter will change, if the output is loaded with a load with a resistive behavior:

| OPERATION Mode | Effect on power converter's output current, $I_O$ |
| --- | --- |
| Normal -> Margin Low | $I_O$ will decrease with $\Delta I_O$ |
| Normal -> Margin High | $I_O$ will increase with $\Delta I_O$ |
| Margin Low -> Margin High | $I_O$ will increase with $\sim 2\Delta I_O$ |
| Margin High -> Margin Low | $I_O$ will decrease with $\sim 2\Delta I_O$ |

The power converter's output current is read by the READ_IOUT PMBus command (0x8C).

It shall be appreciated by a person skilled in the art that the embodiments disclosed herein are merely example embodiments, and that any details and measures are purely given as examples.

The invention claimed is:

1. An apparatus for a power system with a power input at an upstream end and one or more power outputs connected to one or more loads in a downstream end, the power system comprising a plurality of devices interconnected in a tree topology for delivering power, and wherein a change of an operation state or parameter of each a respective one of the devices causes a related change of an operation state or parameter of other ones of the devices connected to that device downstream thereof in the tree topology, said apparatus being communicatively coupled to each of the devices and comprising a processor and a memory storing instructions that, when executed by the processor, causes the apparatus to:
   identify each of the devices interconnected in the tree topology;
   cause a change of an operation state or parameter of each of the devices at a time;
   determine, for each of the devices having an operation state or parameter thereof changed, which of the other devices having a related change of an operation state or parameter thereof, if any; and
   identify how the devices are connected in the tree topology based on said determined other devices having a related change of an operation state or parameter thereof, if any, for each of said devices having an operation state or parameter thereof changed, commencing by identifying most downstream devices in the tree topology by identifying those ones of the devices, for which a change of an operation state or parameter thereof does not cause any other devices to have a related change of an operation state or parameter thereof.

2. The apparatus of claim 1, wherein the memory further stores instructions that, when executed by the processor, causes the apparatus to:
   identify second most downstream devices by identifying those ones of the devices, which are not identified as the most downstream devices, for which a change of an operation state or parameter thereof does not cause any other ones of the devices, which are not identified as the most downstream devices, to have a related change of an operation state or parameter thereof;
   in response to determining a number of most and second most downstream devices is less than a number of identified devices interconnected in the tree topology, identify third most downstream devices by identifying those ones of the devices, which are not identified as the most or second most downstream devices, for which a change of an operation state or parameter thereof does not cause any other ones of the devices, which are not identified as the most or second most downstream devices, to have a related change of an operation state or parameter thereof; and
   in response to determining the number of most and second most, and a number of third most downstream devices is less than the number of identified devices interconnected in the tree topology, identify a fourth most downstream devices by identifying those ones of the devices, which are not identified as the most, second most, or third most downstream devices, for which a change of an operation state or parameter thereof does not cause any other ones of the devices, which are not identified as the most, second most, or third most downstream devices, to have a related change of an operation state or parameter thereof.

3. The apparatus of claim 2, wherein the memory further stores instructions that, when executed by the processor, causes the apparatus to:
   determine how the most downstream devices are connected to the second most downstream devices based on which of the most downstream devices having an operation state or parameter thereof changed for each of the second most downstream devices having an operation state or parameter thereof changed;
   determine how the second most downstream devices are connected to the third most downstream devices, if any, based on which of the second most downstream devices having an operation state or parameter thereof changed for each of the third most downstream devices having an operation state or parameter thereof changed; and
   determine how the third most downstream devices are connected to the fourth most downstream devices, if any, based on which of the third most downstream devices having an operation state or parameter thereof changed for each of the fourth most downstream devices having an operation state or parameter thereof changed.

4. The apparatus of claim 1, wherein the change of an operation state or parameter of each of the devices comprises to turn the device off and the related change of an operation state or parameter thereof comprises a loss of power.

5. The apparatus of claim 1, wherein the change of an operation state or parameter of each of the devices comprises to alter a duty cycle of the device and the related change of an operation state or parameter thereof comprises a corresponding duty cycle alteration.

6. The apparatus of claim 1, wherein the change of an operation state or parameter of each of the devices comprises to alter a duty cycle of the device and the related change of an operation state or parameter thereof comprises a corresponding output current alteration.

7. The apparatus of claim 1, wherein the memory of the apparatus further stores an identification of each of the devices that should be connected in the tree topology, and the memory further stores instructions that, when executed by the processor, causes the apparatus to compare the identified devices interconnected in the tree topology with the devices that should be connected in the tree topology to verify the devices.

8. The apparatus of claim 1, wherein the memory of the apparatus further stores an identification of how the devices should be connected in the tree topology, and the memory further stores instructions that, when executed by the processor, causes the apparatus to compare how the devices are connected in the tree topology with how the devices should be connected in the tree topology to verify the tree topology.

9. The apparatus of claim 1, wherein the memory further stores instructions that, when executed by the processor, causes the apparatus to perform an operation comprising of determining how the power system should be operated, based on how the devices are connected in the tree topology.

10. The apparatus of claim 1, wherein the apparatus is a board power manager (BPM).

11. The apparatus of claim 1, wherein the plurality of devices interconnected in a tree topology comprise at least one of a power input module (PIM), intermediate bus converters (IBCs), point of load (POL) devices and direct current (DC)/DC power converter devices.

12. The apparatus of claim 1, wherein the apparatus is communicatively coupled to the devices via a serial bus protocol.

13. The apparatus of claim 12, wherein the serial bus protocol is an open standard power-management protocol Power Management Bus (PMBus) protocol.

14. A power system with a power input at an upstream end and one or more power outputs connected to one or more loads in a downstream end, the power system comprising a plurality of devices interconnected in a tree topology for delivering power, and wherein a change of an operation state or parameter of a respective one of the devices causes a related change of an operation state or parameter of other ones of the devices connected to that device downstream thereof in the tree topology, the power system further comprising an apparatus, said apparatus communicatively coupled to each of the devices and comprising a processor and a memory storing instructions that, when executed by the processor, causes the apparatus to:
    identify each of the devices interconnected in the tree topology;
    cause a change of an operation state or parameter of each of the devices at a time;
    determine, for each of the devices having an operation state or parameter thereof changed, which of the other devices having a related change of an operation state or parameter thereof, if any; and
    identify how the devices are connected in the tree topology based on said determined other devices having a related change of an operation state or parameter thereof, if any, for each of said devices having an operation state or parameter thereof changed, commencing by identifying most downstream devices in the tree topology by identifying those ones of the devices, for which a change of an operation state or parameter thereof does not cause any other devices to have a related change of an operation state or parameter thereof.

15. A non-transitory machine-readable storage medium having computer code stored therein, which when executed by a set of one or more processors of an apparatus for a power system with a power input at an upstream end and one or more power outputs connected to one or more loads in a downstream end, the power system comprising a plurality of devices interconnected in a tree topology for delivering power, and wherein a change of an operation state or parameter of a respective one of the devices causes a related change of an operation state or parameter of other ones of the devices connected to that device downstream thereof in the tree topology, causes the apparatus to perform operations comprising:
    identifying each of the devices interconnected in the tree topology;
    causing a change of an operation state or parameter of each of the devices at a time;
    determining, for each of the devices having an operation state or parameter thereof changed, which of the other devices having a related change of an operation state or parameter thereof, if any; and
    identifying how the devices are connected in the tree topology based on said determined other devices having a related change of an operation state or parameter thereof, if any, for each of said devices having an operation state or parameter thereof changed, commencing by identifying most downstream devices in the tree topology by identifying those ones of the devices, for which a change of an operation state or parameter thereof does not cause any other devices to have a related change of an operation state or parameter thereof.

16. A method for a power system with a power input at an upstream end and one or more power outputs connected to one or more loads in a downstream end, the power system comprising a plurality of devices interconnected in a tree topology for delivering power, and wherein a change of an operation state or parameter of a respective one of the devices causes a related change of an operation state or parameter of other ones of the devices connected to that device downstream thereof in the tree topology, said method comprising:
    identifying each of the devices interconnected in the tree topology;
    causing a change of an operation state or parameter of each of the devices at a time;
    determining, for each of the devices having an operation state or parameter thereof changed, which of the other devices have a related change of an operation state or parameter thereof, if any; and
    identifying how the devices are connected in the tree topology based on said determined other devices having a related change of an operation state or parameter thereof, if any, for each of said devices having an operation state or parameter thereof changed, commencing by identifying most downstream devices in the tree topology by identifying those ones of the devices, for which a change of an operation state or parameter thereof does not cause any other devices to have a related change of an operation state or parameter thereof.

17. The method of claim 16, further comprising:
    identifying second most downstream devices by identifying those ones of the devices, which are not identified as the most downstream devices, for which a change of an operation state or parameter thereof does not cause any other ones of the devices, which are not identified as the most downstream devices, to have a related change of an operation state or parameter thereof; and in response to determining a number of most and second most downstream devices is less than a number of identified devices interconnected in the tree topology, identifying third most downstream devices by identifying those ones of the devices, which are not identified as the most or second most downstream devices, for which a change of an operation state or parameter thereof does not cause any other ones of the devices, which are not identified as the most or second most downstream devices, to have a related change of an operation state or parameter thereof.

18. The method of claim 17, further comprising:

determining how the most downstream devices are connected to the second most downstream devices based on which of the most downstream devices having an operation state or parameter thereof changed for each of the second most downstream devices having an operation state or parameter thereof changed;

determining how the second most downstream devices are connected to the third most downstream devices, if any, based on which of the second most downstream devices having an operation state or parameter thereof changed for each of the third most downstream devices having an operation state or parameter thereof changed.

\* \* \* \* \*